C. Guidet.
Stone Pavement.
N° 85814. Patented Jan. 12. 1869.
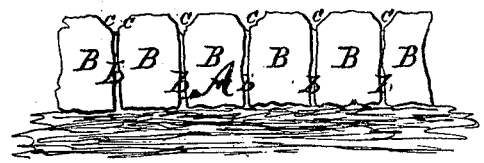
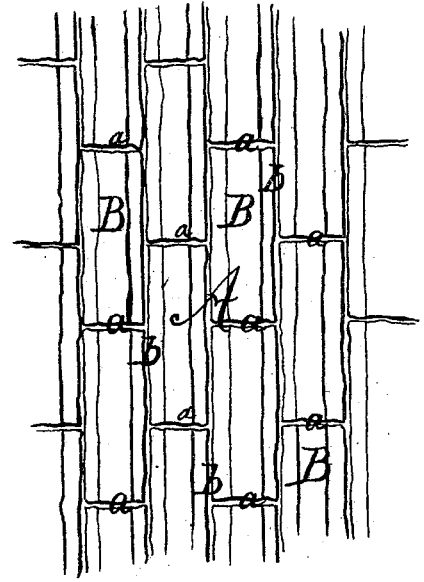
Witnesses: Inventor:

UNITED STATES PATENT OFFICE.

CHARLES GUIDET, OF NEW YORK, N. Y.

IMPROVED STONE PAVEMENT.

Specification forming part of Letters Patent No. 85,814, dated January 12, 1869

To all whom it may concern:

Be it known that I, CHARLES GUIDET, of the city, county, and State of New York, have invented a new and useful Improved Pavement; and I do hereby declare the following to be a clear, full, and exact description of the same, sufficient to enable others skilled in the art to which my invention appertains to fully understand and use the same, reference being had to the accompanying drawings, making part of this specification, and in which—

Figure 1 represents a longitudinal section of this invention. Fig. 2 is a plan or top view thereof.

Similar letters of reference indicate corresponding parts in the two figures.

This invention relates to a pavement which is composed of stone blocks forming parallelopipeds, the narrow ends or edges of which are cut smooth, while their broad sides are cut purposely uneven, or rugged, the top edges of said broad sides being chamfered off in such a manner that said blocks, when put together, form close joints at their narrow ends and open joints at the broad sides, and a pavement is obtained which offers a good foothold for the draft animals, and at the same time a smooth surface for the wheels passing over the same.

A represents a section of my pavement, which is composed of a series of stone blocks, B. These blocks are cut in in the form of parallelopipeds, unlike the blocks used in what is known as the "Russ" or "Belgian" pavement, which are cut in the form of inverted truncated pyramids, and, furthermore, the narrow edges or ends $a$ of my blocks are cut smooth, while the broad sides or surfaces $b$ thereof are purposely cut rugged or uneven, and the top edges of these broad sides are chamfered off, as shown at $c$, Fig. 1. If two inverted truncated pyramids, as used in the Russ or Belgian pavement, are placed side by side, a close joint is formed on the top surface, and the pavement thus produced offers no foothold to the draft animals. But by placing a series of my blocks B together, as shown in Fig. 2, the joints between the smooth narrow edges $a$, which run parallel with the sides of the street, become close, while the joints formed between the broad rugged surfaces $b$, with the chamfered edges $c$, which joints run transversely across the street, become open and a pavement is formed which offers a firm hold to the draft animals, while it presents a smooth surface to the wheels passing over it. The open joints left between the rugged surfaces $b$ of the blocks are filled with sand, and the pavement becomes perfectly firm and solid, and the single blocks are not liable to work loose.

I do not claim broadly as my invention a pavement composed of blocks made in the form of parallelopipeds; but What I do claim, and desire to secure by Letters Patent, is—

A pavement composed of stone blocks, made in the form of parallelopipeds, having their narrow edges or ends cut smooth and their broad sides purposely cut rugged or uneven and with chamfered edges, substantially as and for the purpose described.

CHARLES GUIDET.

Witnesses:
W. HAUFF,
ERNEST F. KASTENHUBER.